United States Patent [19]
Lin et al.

[11] Patent Number: 5,906,346
[45] Date of Patent: May 25, 1999

[54] BASEPLATE HOLDER

[75] Inventors: Tung Yen Lin; Fan-Mao Tseng; Chen-Hsing Peng, all of Taoyuan, Taiwan

[73] Assignee: Enlight Corporation, Taoyuan, Taiwan

[21] Appl. No.: 08/891,333

[22] Filed: Jul. 10, 1997

[30] Foreign Application Priority Data

Nov. 15, 1996 [CN] China .................................. 85217534

[51] Int. Cl.⁶ .................................................. F16L 3/08
[52] U.S. Cl. .................................. 248/224.8; 248/225.11; 411/508
[58] Field of Search .......................... 248/224.8, 225.11, 248/225.21, 220.21, 229.16, 229.26, 220.43; 52/506.05, 506.01, 714, 715; 411/913, 508

[56] References Cited

U.S. PATENT DOCUMENTS

| | | | |
|---|---|---|---|
| 3,336,828 | 8/1967 | Grauger | 411/913 |
| 3,486,158 | 12/1969 | Soltysik et al. | 411/913 |
| 4,818,164 | 4/1989 | Kazyak | 411/508 |
| 5,727,761 | 3/1998 | Ho | 248/224.8 |

*Primary Examiner*—Leslie A. Braun
*Assistant Examiner*—Willie Berry, Jr.
*Attorney, Agent, or Firm*—Ladas & Parry

[57] ABSTRACT

A baseplate holder for conveniently securing a mother board on a baseplate has a ⊓-shaped profile, the top face thereof being formed with a hook or a threaded hole, both vertical sidewalls being each provided on the end with a horizontal projection for insertion into the respective stamped hole on the baseplate. If a threaded hole is formed on the top face of the holder, the edges of a hole formed on the respective vertical sidewall can be formed with at least a tongue extending inwardly to support the screw passing through the threaded hole.

9 Claims, 4 Drawing Sheets

BASEPLATE HOLDER

FIELD OF THE INVENTION

The present invention relates to a baseplate holder for conveniently securing a mother board on a baseplate.

BACKGROUND OF THE INVENTION

Information industry has become one of the most important industries in the world. To maintain the superiority in this competitive field, increasing the efficiency in producing computers is necessary. In the past, the processes of securing a mother board on the baseplate in assembling computers are as shown in FIGS. 1 and 2. FIG. 1 shows a bolt. While assembling a mother board onto the baseplate, the bolt is first screwed into a threaded hole preset on the baseplate, and then a screw is inserted through a threaded hole on the mother board and screwed into the bolt secured on the baseplate, so as to fix the mother board on the baseplate. In this manner, two screwing operations are required and threaded holes must be prepared in advance on the baseplate, which manner takes much time. FIG. 2 shows a holder having a top face and four vertical sidewalls. The top face is formed thereon with a threaded hole or provided with a hook. On both sides of the middle of each vertical sidewall are provided with projections and on the end of each vertical sidewall is formed with a horizontal flange with a gap formed between the horizontal flange and one end of the projection, the gap being the same thickness as that of the baseplate. While assembling a mother board, the holder is first inserted from the back of the baseplate (opposite to the side of the mother board) into a rectangular hole preformed on the baseplate and then secured on the baseplate through the gaps between the horizontal flanges on the ends of the vertical sidewalls and the ends of the projections. Further, a screw is inserted through the threaded hole on the mother board and screwed into the threaded hole on the top face of the holder secured on the baseplate, or the hook on the top face of the holder can hook an edge of the mother board so as to secure the mother board on the baseplate. With such a holder, although the operations of screwing can be eliminated and thus the time for assembling is decreased, such a holder is not easy to manufacture and requires more material, which results in increased production cost. In addition, during assembling, the baseplate has to be turned over so as to allow the holder to be inserted into the baseplate from the back thereof and fixed thereto and the baseplate has to be turned over further for attaching the mother board thereon, which causes the inconvenience in assembling and extends the time of assembly. Further, in case the hook on the top face of the holder was found misguided, the baseplate has to be turned over again to release and reinstall the holder, which seriously delays the process of assembly.

SUMMARY OF THE INVENTION

In view of the above disadvantages, the present invention provides a baseplate holder which is easy to assemble with less material needed and production cost. The baseplate holder of the present invention has a ⊓-shaped profile, the top face thereof being formed with a hook or a threaded hole, both vertical sidewalls being each provided on the end with a horizontal projection for insertion into the respective stamped hole on the baseplate. If a threaded hole is formed on the top face of the holder, the edge of a hole formed on the respective vertical sidewall can be formed with at least a tongue extending inwardly to support the screw passing through the threaded hole.

From the description of the preferred embodiments with reference to the accompanying drawings, the structure and features of the subject invention will be better understood by those skilled in the art.

DETAILED DESCRIPTION OF THE PREFERRED EMBODIMENTS

Figure 1:
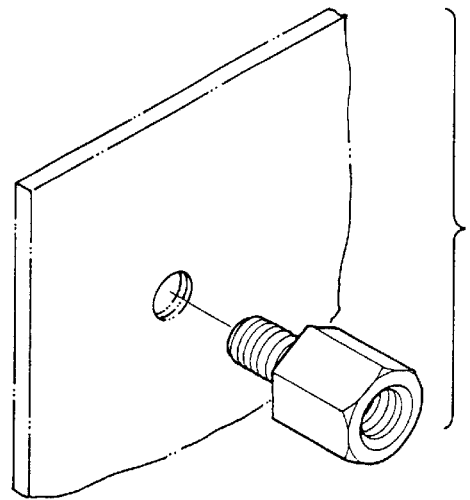
FIG. 1 shows a perspective view of a conventional baseplate holder with the baseplate shown in phantom lines.
Figure 2:
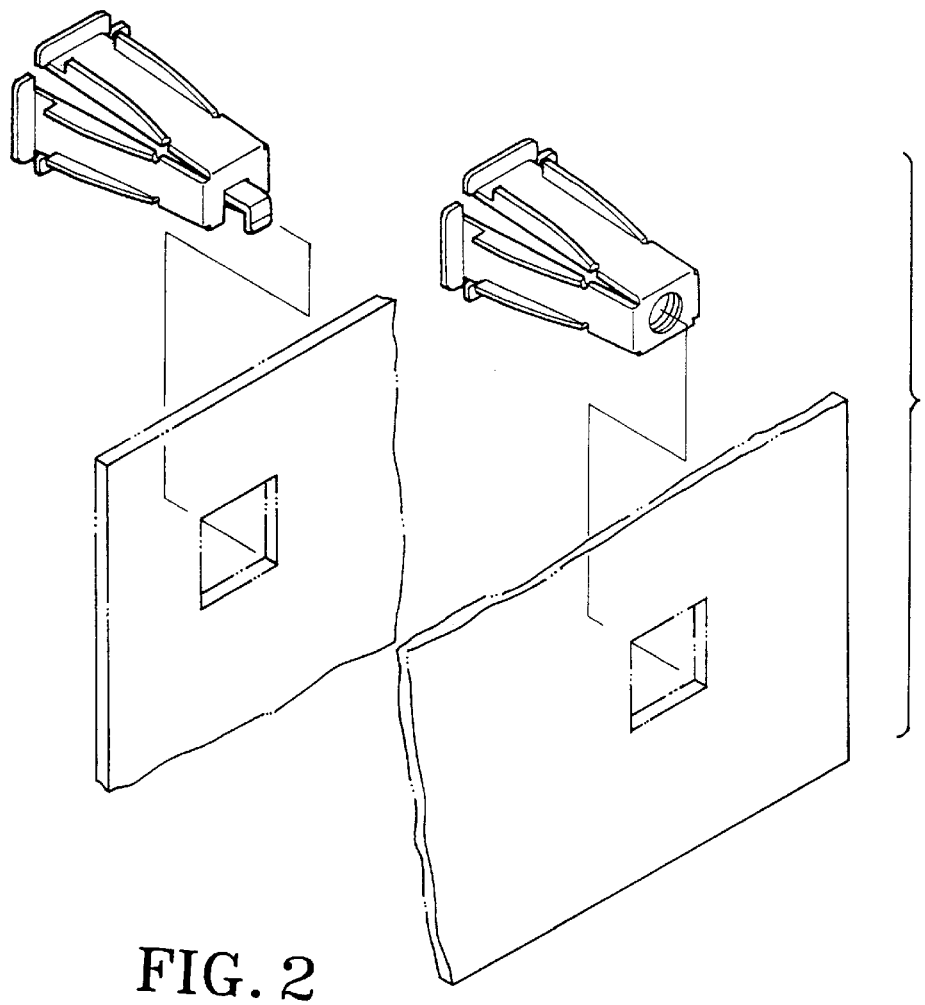
FIG. 2 shows a perspective view of other conventional baseplate holders with the baseplate shown in phantom lines.
Figure 3:
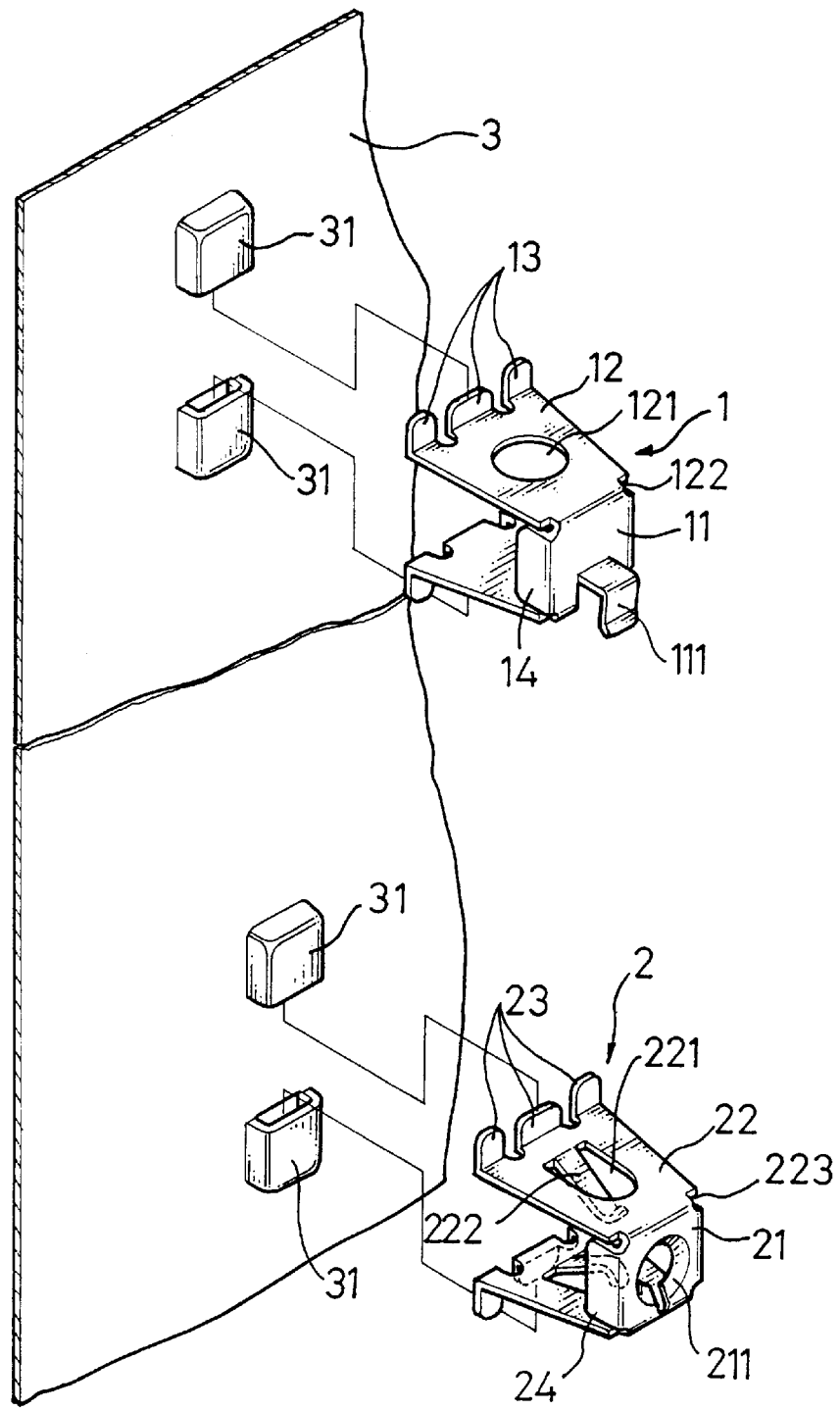
FIG. 3 shows a perspective view of the baseplate holders of the present invention.

FIG. 3 shows two embodiments of the baseplate holder of the present invention, wherein the baseplate holder 1 of the first embodiment comprising a top face 11 and a pair of opposite vertical sidewalls 12 reveals a ⊓-shaped profile, the top face 11 being formed thereon with a hook 111 and the vertical sidewalls 12 being each having a first end connected to a side of the top face and extending to an opposite end thereof with three outwardly extending horizontal projections 13. The central horizontal projection 13 can be inserted into a stamped hole 31 formed on the baseplate 3. Both ends of the junction between each of the vertical sidewalls 12 and the top face 11 are each provided with a chamfer 122 and a reinforced plate 14 is formed between the top face 11 and each of the opposite vertical sidewalls 12. The vertical sidewalls 12 are each formed thereon with a hole 121 to facilitate the grasp by hands.

The second embodiment of the baseplate holder 2 shown in FIG. 3 comprising a top face 21 and a pair of opposite vertical sidewalls 22 reveals a ⊓-shaped profile, the top face 21 being formed thereon with a threaded hole 211 and the vertical sidewalls 22 being each formed on one end thereof with three outwardly extending horizontal projections 23. The central horizontal projection 23 can be inserted into the stamped hole 31 on the baseplate 3. Both ends of the junction between each of the vertical sidewalls 22 and the top face 21 are each provided with a chamfer 223 and a reinforced plate 24 is formed between the top face 21 and each of the opposite vertical sidewalls 22. The vertical sidewalls 22 are each formed thereon with a hole 221 to facilitate the grasp by hands. The edge of the hole 221 can be formed with at least a tongue 222 extending inwardly to support the screw passing through the threaded hole 211.

Figure 4:
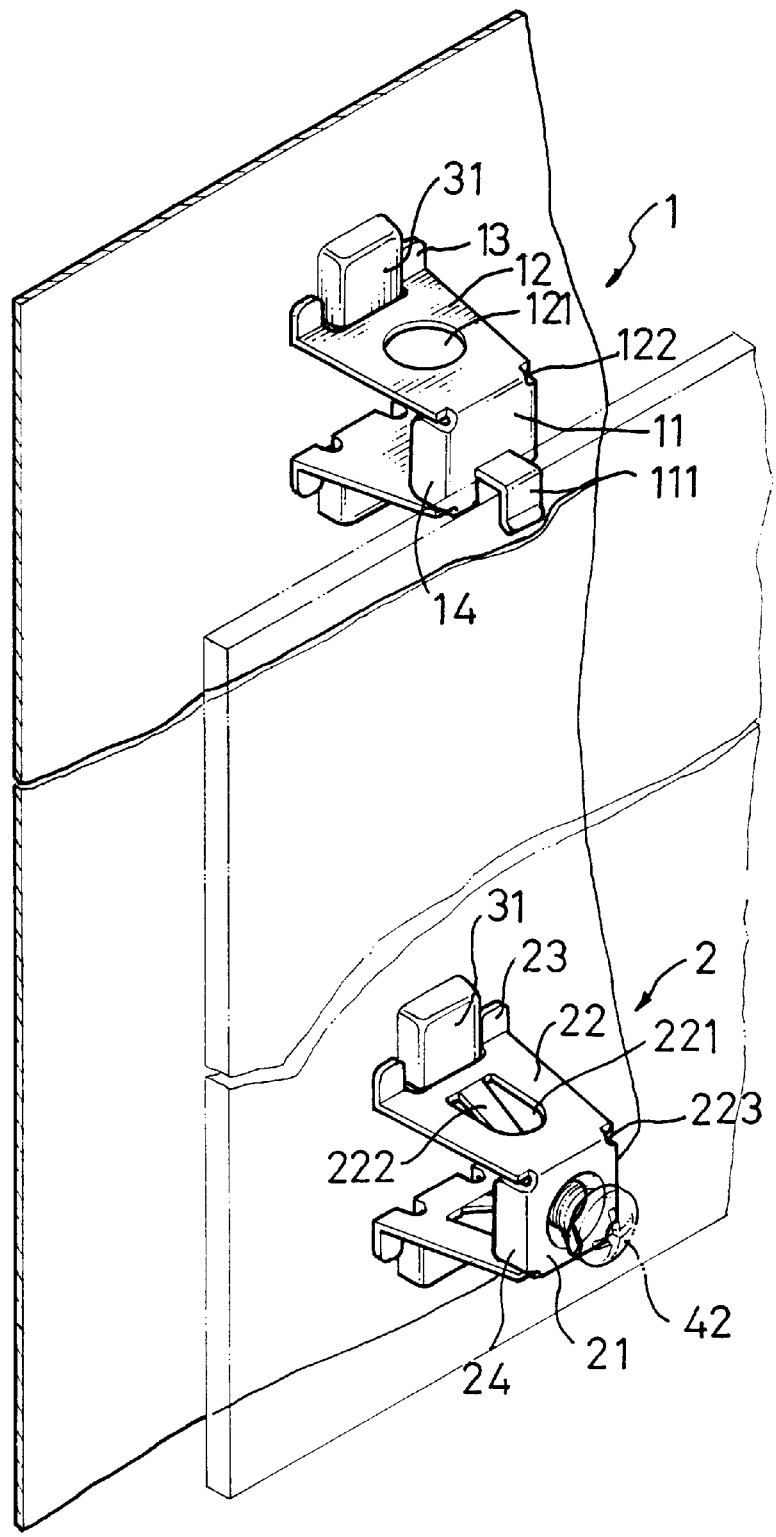
FIG. 4 shows a schematic view of the baseplate holders of the present invention secured on a baseplate.

When a mother board 4 is to be placed on the baseplate 3, the baseplate holder 1 or the baseplate holder 2 is first secured on the baseplate 3. FIG. 4 shows the schematic view of two embodiments of the baseplate holder secured on the baseplate 3. By resiliently pressing two vertical sidewalls 12 of the baseplate holder 1 inwardly, the central horizontal projection 13 formed on the end of each vertical sidewall 12 is inserted into the respective stamped hole 31 on the baseplate 3 by means of the return resiliency of the vertical sidewalls 12 so as to secure the baseplate holder 1 on the baseplate 3 with the other two horizontal projections 13 on the end of each vertical sidewall 12 of the baseplate holder 1, that is positioned on both sides of the stamped hole 31 for assisting the baseplate holder 1 to be secured on the baseplate 3. After the baseplate holder 1 is secured on the baseplate 3, the hook 111 provided on the top face 11 of the baseplate holder 1 serves to hook the edge of the mother board 4 so as to secure the mother board 4 on the baseplate 3.

In addition, by resiliently pressing two vertical sidewalls 22 of the baseplate holder 2 inwardly, the central horizontal projection 23 formed on the end of each vertical sidewall 22 is inserted into the respective stamped hole 31 on the baseplate 3 by means of the return resiliency of the vertical sidewalls 22 so as to secure the baseplate holder 2 on the baseplate 3 with the other two horizontal projections 23 on the end of each vertical sidewall 22 of the baseplate holder 2, that is positioned on both sides of the stamped hole 31 for assisting the baseplate holder 2 to be secured on the baseplate 3. After the baseplate holder 2 is secured on the baseplate 3, a screw 42 is screwed into a threaded hole 41 formed on the mother board 4 and the threaded hole 211 formed on the top face 21 of the baseplate holder 2 (as shown in FIG. 5) so as to secure the mother board 4 on the baseplate 3.

Figure 5:
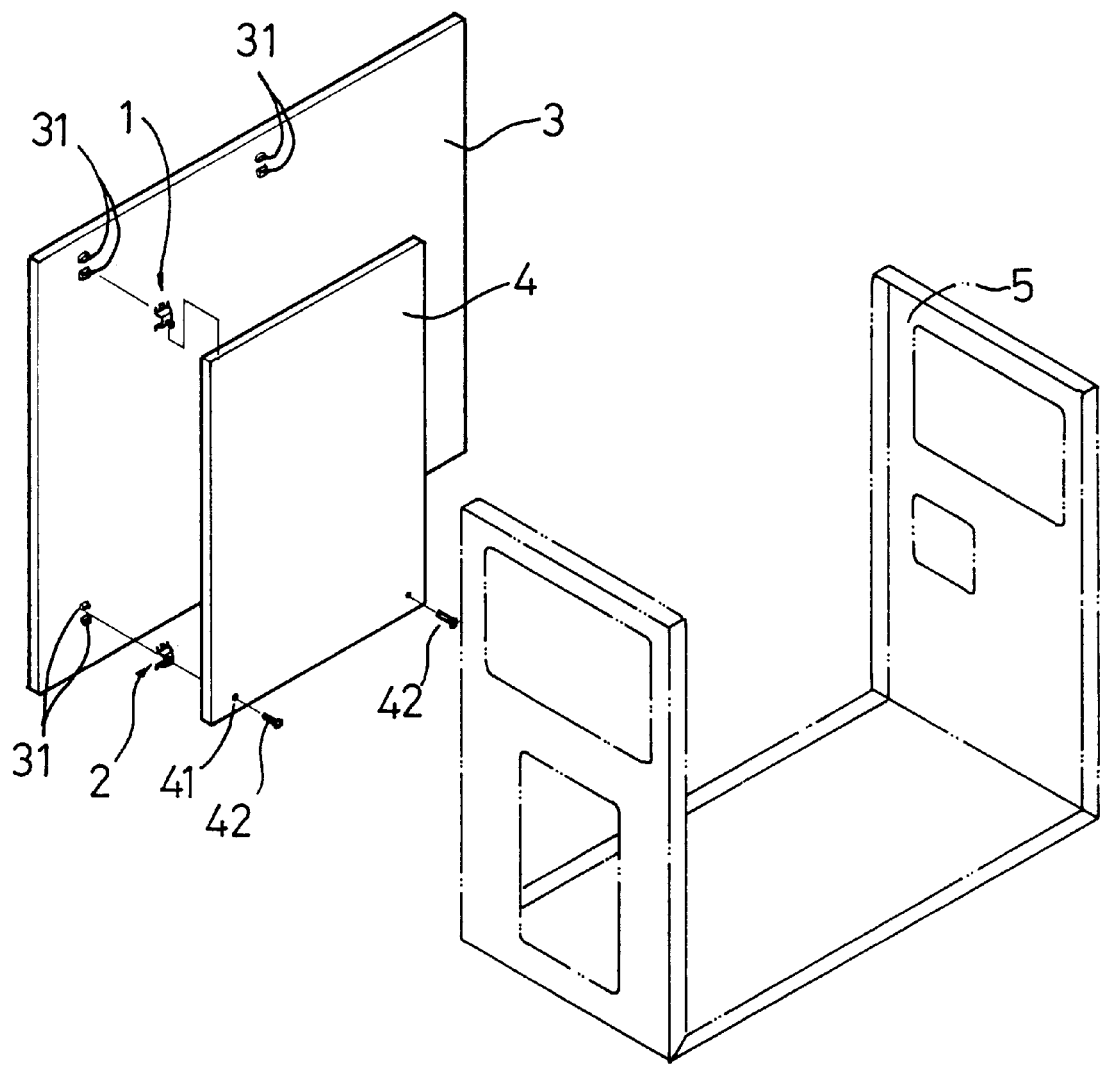
FIG. 5 shows a perspective view showing the relationships among the baseplate holders of the present invention, a baseplate, a mother board and a computer case.

After the mother board 4 is secured on the baseplate 3 by means of the baseplate holder 1 and/or the baseplate holder 2, the assembly is then installed into the computer case 5, as shown in FIG. 5.

The baseplate holder of the present invention is simple in structure, easy to assemble and capable of reducing material needed and production cost, and thus provides significant improvements over conventional baseplate holders.

The use of the baseplate holder for securing the mother board 4 on the baseplate 3 is not limited to either embodiment. Both embodiments of the present invention can be used, as desired, in different combinations for optimum results.

Although the present invention has been described with respect to the preferred embodiments thereof, various changes and applications can be made by those skilled in the art without departing from the technical concepts of the present invention. The present invention is not limited to the particular details as described in the preferred embodiments. Therefore, it is intended that all such changes of certain features of the preferred embodiments which do not alter the overall basic functions and the concepts of the present invention are within the scope defined in the appended claims.

We claim:

1. A baseplate holder comprising a top face and a pair of opposite vertical sidewalls to reveal a ⊓ shaped profile, said top face being formed with a threaded hole, said vertical sidewalls being each formed with a hole thereon the edge of said hole being provided with at least a tongue extending inwardly for supporting a screw to be extended through said threaded hole, and end of each said vertical sidewalls being horizontal extended with three horizontal projections, both ends of a junction between each of said vertical sidewalls and said top face being each formed with a chamfer, a pair of opposite reinforced plates being extended from said top face, each said reinforced plate being adjacent to said vertical sidewalls.

2. A baseplate holder comprising:

a face member having first and second and third and fourth generally parallel opposite sides and a top surface at least part of which is generally planar for supporting a board;

generally planar sidewall members having first ends respectively connected to the first and second sides of the face member and opposite ends, the sidewall members extending from the first ends away from the top surface and, when supported thereon, the board to the opposite ends;

a central and opposite end projections on the opposite ends of each of the sidewall members and extending away from each other for the central projections to engage respective stamped holes in a baseplate after the sidewall members have been compressed toward each other and released and for the opposite end projections respectively to straddle the respective stamped holes;

plates respectively extending from the third and fourth sides of the face member between the sidewall members and towards but not as far as the opposite ends of the sidewall members; and means on the face member for securing the board when supported on the top surface.

3. The baseplate holder according to claim 2, and further comprising a hole in one or both of the sidewall members for facilitating the grasping thereof.

4. The baseplate holder according to claim 3, wherein the means is a hook.

5. The baseplate holder according to claim 3, wherein the means is a hole for receiving a screw.

6. The baseplate holder according to claim 5, and further comprising means comprising at least a tongue extending from at least one of the sidewall members for supporting the screw when received in the hole for receiving the screw.

7. The baseplate holder according to claim 2, wherein the means is a hook.

8. The baseplate holder according to claim 2, wherein the means is a hole for receiving a screw.

9. The baseplate holder according to claim 8, and further comprising means comprising at least a tongue extending from at least one of the sidewall members for supporting the screw when received in the hole for receiving the screw.

* * * * *